(12) United States Patent
Umezurike (10) Patent No.: US 11,367,065 B1
(45) Date of Patent: Jun. 21, 2022

(54) DISTRIBUTED LEDGER SYSTEM FOR ELECTRONIC TRANSACTIONS

(71) Applicant: Josiah Johnson Umezurike, Columbia, SC (US)

(72) Inventor: Josiah Johnson Umezurike, Columbia, SC (US)

(*) Notice: Subject to any disclaimer, the term of this patent is extended or adjusted under 35 U.S.C. 154(b) by 134 days.

(21) Appl. No.: 16/697,157

(22) Filed: Nov. 26, 2019

Related U.S. Application Data (63) Continuation of application No. 16/393,956, filed on Apr. 24, 2019, now Pat. No. 10,999,276, and a continuation of application No. 15/875,378, filed on Jan. 19, 2018, now Pat. No. 10,911,217, which is a continuation of application No. 16/393,956, filed on Apr. 24, 2018, now Pat. No. 62,661,765.

(51) Int. Cl.
| | | |
|---|---|---|
| G06Q 20/36 | (2012.01) | |
| H04L 9/06 | (2006.01) | |
| G06Q 20/06 | (2012.01) | |

(52) U.S. Cl.
CPC ..... *G06Q 20/3672* (2013.01); *G06Q 20/0658* (2013.01); *G06Q 20/363* (2013.01); *G06Q 20/3674* (2013.01); *H04L 9/0637* (2013.01)

(58) Field of Classification Search
CPC ............. G06Q 20/3672; G06Q 20/363; G06Q 20/0658; G06Q 20/3674; H04L 9/0637
See application file for complete search history.

(56) References Cited

U.S. PATENT DOCUMENTS

| | | | | |
|---|---|---|---|---|
| 10,348,484 | B2* | 7/2019 | King | H04L 9/30 |
| 10,601,585 | B1* | 3/2020 | Robinson | H04L 9/0894 |
| 10,749,681 | B2* | 8/2020 | Andrade | H04L 9/0866 |
| 10,956,614 | B2* | 3/2021 | Daniel | G06F 21/10 |

(Continued)

OTHER PUBLICATIONS

Josiah J. Umezuricke et al., LokChainTM WhitePaper, Interconnection of the future Mobile, Blockchain and IoT. Nov. 30, 2018.

*Primary Examiner* — Niral S Lakhia
(74) *Attorney, Agent, or Firm* — Gibraltar Consulting LLC; Tariq S. Najee-Ullah (57) ABSTRACT

Disclosed herein are systems and methods that integrate distributed ledger (or blockchain) capabilities in a highly distributed computing environment, such as mobile, Internet of Things (IoT). A platform allows for such integration, supporting blockchain-enabled transactions between IoT and mobile devices. Particularly, the platform is a Distributed Ledger System for e-Transactions (DLSeT). The DLSeT platform includes various blockchain features, such as computing, distributed ledgers (storage), cryptocurrency, and cryptography (homomorphic encryption). Furthermore, the DLSeT platform utilizes a Lattice Face Secret Key Infrastructure (LFSKI) feature that is distinct to the platform. By employing LFSKI, the DLSeT platform realizes advantages over blockchain platforms using n public key infrastructure (PKI), being able to execute secure, efficient, and decentralized e-transactions. The DLSeT platform supports additional features, such as a Zero Knowledge Triangle Flow protocol, a Prove of Simple Universal Wallet Address protocol, and a Data Life Cycle security with its unique Data life cycle framework.

18 Claims, 5 Drawing Sheets

(56) References Cited

U.S. PATENT DOCUMENTS

| | | | |
|---|---|---|---|
| 2017/0109744 A1* | 4/2017 | Wilkins | H04L 9/0637 |
| 2017/0317833 A1* | 11/2017 | Smith | H04L 9/3066 |
| 2018/0013567 A1* | 1/2018 | Davis | H04L 9/3242 |
| 2018/0060860 A1* | 3/2018 | Tian | G06Q 20/401 |
| 2018/0089041 A1* | 3/2018 | Smith | G06F 16/2255 |
| 2018/0115413 A1* | 4/2018 | King | H04L 63/06 |
| 2018/0225466 A1* | 8/2018 | Ducatel | H04L 9/0637 |
| 2018/0225469 A1* | 8/2018 | Daniel | G06Q 20/3678 |
| 2019/0228407 A1* | 7/2019 | Wu | G06Q 20/3823 |

* cited by examiner

DISTRIBUTED LEDGER SYSTEM FOR ELECTRONIC TRANSACTIONS

RELATED APPLICATION(S)

Related U.S. patent application Ser. No. 16/393,956, filed on Apr. 24, 2019 and entitled "INDUSTRIAL INTERNET ENCRYPTION SYSTEM," assigned to the assignee of the present application, is hereby incorporated by reference.

Related U.S. patent application Ser. No. 15/875,378, filed on Jan. 19, 2018 and entitled "ENDPOINT-TO-ENDPOINT CRYPTOGRAPHIC SYSTEM FOR MOBILE AND IOT DEVICES," assigned to the assignee of the present application, is hereby incorporated by reference.

Related publication, dated Nov. 30, 2018 and entitled "LokChain™ WhitePaper, Interconnection of the future Mobile, Blockchain and IoT," is hereby incorporated by reference.

It is intended that each of the referenced applications may be applicable to the concepts and embodiments disclosed herein, even if such concepts and embodiments are disclosed in the referenced applications with different limitations and configurations and described using different examples and terminology.

TECHNICAL FIELD

The present disclosure relates generally to mobile, blockchain, distributed ledger, and Internet of Things (IoT) technologies.

BACKGROUND

Electronic commerce is advancing towards the emergence of multiple blockchain platforms, where the exchange of currency, including cryptocurrency, is supported in a secure and decentralized manner. The Internet of Things (IoT) can refer to a large system that includes a wide range of devices connected in a highly distributed architecture. For example, an IoT system can leverage hundreds of thousands of devices using wireless connections that are established over wide area networks, such as the Internet. Thus, IoT systems are typically characterized by great scalability and interoperability. In contrast, many existing blockchain platforms are plagued by very limited scalability and restricted interoperability. With the recent rise in popularity among the tripartite mobile, IoT and blockchain technologies, it may be desirable to leverage their integration. Nonetheless, due to the aforementioned inconsistency with respect to scalability and interoperability, advancing blockchain technology towards practical use within IoT and mobile has been met with many challenges.

BRIEF SUMMARY OF THE DISCLOSURE

According to the embodiments, systems and methods are described that can leverage features of distributed ledger technologies (also referred to herein as blockchain), such as decentralization and cryptocurrency, within highly distributed networking environments, such as Internet of Things (IoT) and the countless mobile and smart phone devices. This integration of distributed ledger and IoT is accomplished by implementing a scalable and interoperable platform, which is configured to support secure electronic transactions (e-transaction) between networks of interconnected nodes. Particularly, as disclosed herein, the platform is a distributed ledger system for e-transactions (DLSeT).

The DLSeT platform can include a serverless operating system with both public, private and consortium distributed ledgers that utilize a Lattice Face Secret Key Infrastructure (LFSKI) feature that is distinct to the platform. The DLSeT platform, employing SKI, can realize advantages over many existing blockchain platforms based on public key infrastructure (PKI), being able to deliver safe and efficient transactions in a decentralized manner.

The DLSeT platform includes a distributed ledger, which maintains secure, and immutable records of all transactions conducted on the platform. The distributed ledger can be configured, at least partially, as a cryptographic infrastructure in a blockchain network. This allows the distributed ledger aspects of the DLSeT platform to act as an encrypted storage enclave for e-transactions. Furthermore, the DLSeT platform utilizes a user's attributes of users that typically does not change often over time (e.g., biometric data, driver license number, etc.) that can be further used to create an encrypted and unique Data Nucleus Aggregator (DNA) for the user. It is a user's DNA that is employed during e-transactions on the DLSeT platform, providing a layer of anonymity and added security for users. By collecting a plurality of different DNAs corresponding to different users, the DLSeT platform creates a silo of Digital Data Nucleic Authority (DDNA) for its nodes. The data of the DDNA serves as the building block for implementing LFSKI. Nodes participating in e-transactions via the DLSeT platform use LFSKI, which requires no private of public keys that are susceptible to hackers and other security threats. Thus, the DLSeT platform using LFSKI realizes privacy, security (e.g., encryption 2048 bits), quantum computing resistance and a secure data life cycle.

Also, the DLSeT platform can utilize a consensus protocol, namely a prove of simple universe wallet address (Po(SuA)), which allows only authorized users of the platform to securely transact. Moreover, the DLSeT platform is configured to allow each user to identify themselves prior to an interaction, with use of a Zero Knowledge Triangle Flow (ZT-Flow) protocol. The ZT-Flow protocol allows the platform to have a trustless framework, where each user involved in a transaction can be identified while performing financial transactions, legitimately with integrity and confidentiality. In addition, the DLSeT platform is configured to use a data life cycle security (DLCs). The DLCs allows users to control their own data, for instance deciding when to monetize their data, or end the life cycle of their data, as desired. The DLCs ensures that only users involved in the transaction can share the data, or have the capability to access their owned data. Accordingly, no other party is allowed to be involved in, or impart a decision on, in the life of the data.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. The accompanying drawings, which are incorporated in and constitute a part of this specification, illustrate several aspects of the disclosure and together with the description, serve to explain the principles of the disclosure.

The figures are not exhaustive and do not limit the present disclosure to the precise form disclosed.

DETAILED DESCRIPTION

The present disclosure can be understood more readily by reference to the following detailed description of the disclosure and the examples included therein.

According to the embodiments, a platform is designed that implements a secure integration of distributed ledger (also referred to herein as blockchain) in distributed computer environments, such as IoT. The Distributed Ledger System for e-transactions (DLSeT) platform can be particularly used to support financial, business, and commerce related interactions, such e-transactions, between IoT devices in a blockchain-enabled manner (further leveraging the user of cryptocurrency and tokens). In addition, the DLSeT platform enables seamless integration of a native cryptocurrency, referred to herein as Lokcoin (LCN), thereon. By integrating the DLSeT platform and LCN, e-transactions between users of decentralized nodes, for instance in an IoT environment, can be supported in a scalable and interoperable manner.

As an example, as part of the DLSeT platform, a user can have a "wallet" installed on their mobile device, allowing LCN to be used as a form of payments in any transaction executed via the platform. Additionally, the DLSeT platform can utilize associated protocols, such as Zero Knowledge Triangle-Flow (ZT-Flow) and proof of simple universal wallet address (Po(SuA)) to perform transactions in a seamless, efficient, and secure manner.

There may be some existing platforms that aim to integrate mobile, IoT and blockchain. Nonetheless, these approaches are based on public key infrastructure (PKI) cryptography. With PKI, there is no flexibility in permissions and roles for users, vendors, mobile nodes and IoT devices. This rigidity implies a continuous breach of privacy associated with PKI via contact made to certificate authorities (CA). For example, in a conventional Blockchain network, there is a server/client architecture, allowing the issuance of public/private keys. However, in many existing Blockchain networks, these public/private keys are not accounted for, neither are they revoked in potentially threatening circumstances. On the contrary, the DLSeT platform, is not restricted by PKI, by employing a particular cryptographic approach, referred to herein a lattice face secret key infrastructure (LFSKI). LFSKI emphasizes total data encryption, secure data life cycle (s-DLC), total privacy, perpetual ownership and total autonomy at rest/transient. Employing SKI allows the DLSeT platform to support interactions in an highly decentralized environment, such as IoT, while maintaining security. Consequently, the DLSeT platform allows end users to contract, transact, distribute, share, and secure immutable records securely, in a decentralized network (e.g., eliminating third parties in eTransactions).

Figure 1:
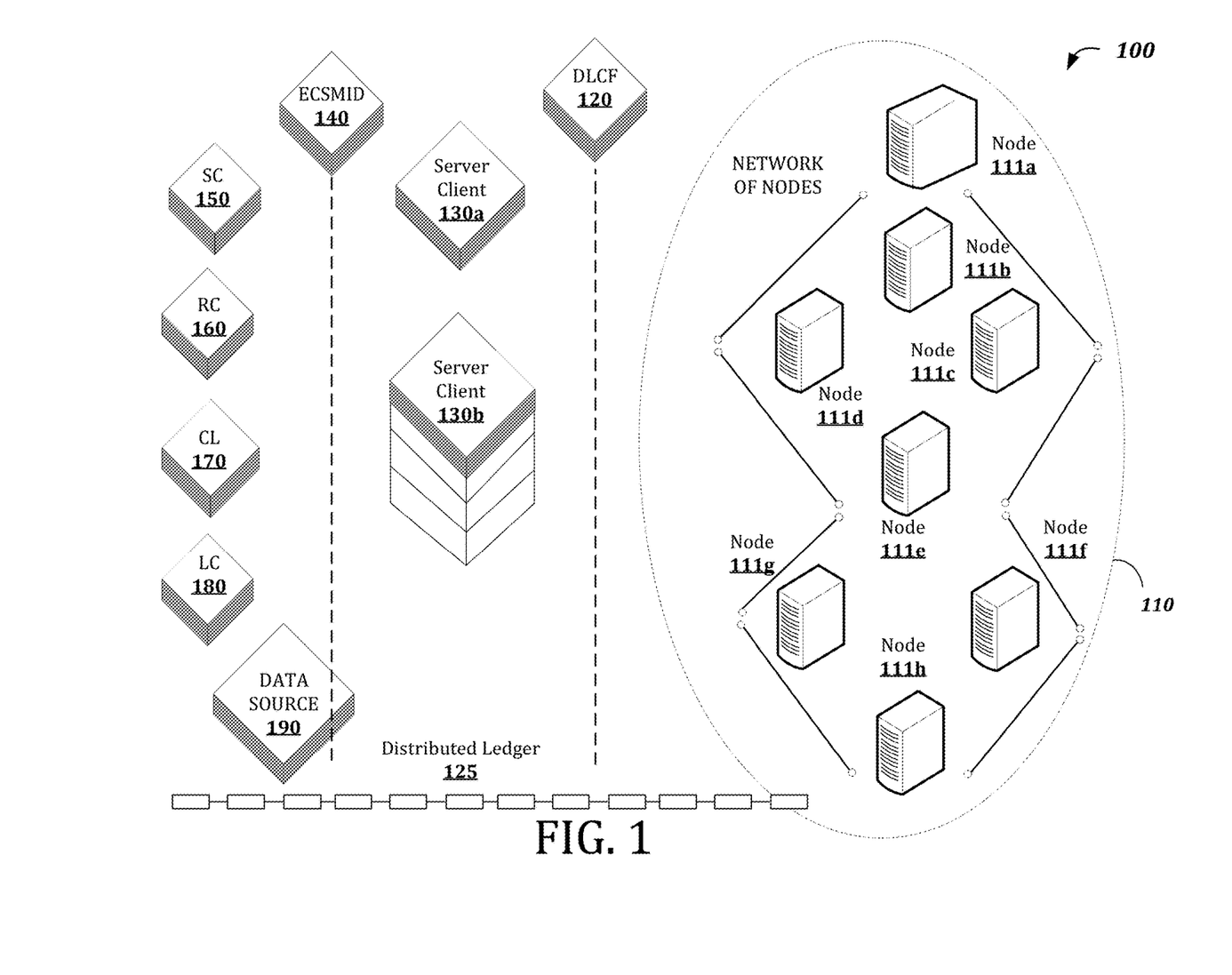
FIG. 1 depicts an example of an architecture for the Distributed Ledger System for e-transactions (DLSeT) in accordance with an exemplary embodiment of the present disclosure.

FIG. 1 depicts an example of an architecture for the DLSeT platform 100. As shown in FIG. 1, the DLSeT platform 100 can include multiple aspects, including but not limited to: node network 110 including nodes 111a-111h; Data Life-Cycle Framework (DLCF) 120; client/servers 130a-130b; an End-point to End-point Cryptographic System for Mobile and IoT (ECSMID) 140; smart contracts 150; remote client 160; contract logic 170; local confirmation 180; and data source 190. However, it should be appreciated that the embodiments are not limited to the example architecture of FIG. 1, and can include various layers and have a structure that is not disclosed herein. As background, there are several issues that can impact the interoperability and scalability of some currently used Blockchain technologies. For instance, there is extremely limited interoperable functionality, such as interactions cross chains, cross organizations, and cross datastores, surrounding many of the technologies used to support cryptocurrency (e.g., Bitcoin, Ethereum, Altcoin, etc.). However, the DLSeT platform 100, disclosed herein, is particularly designed to support scalability and interoperability in a manner that realizes advantages over these current Blockchain platforms. People, machines, technology and processes are welded together in a secure, decentralized, trustless internet of things (IoT ecosystem).

According to some embodiments, the DSLeT platform 100 operates in an IoT environment. In an IoT environment, the node network 110 includes nodes 111a-111h, which are implemented as multiple IoT devices. Generally, IoT can include a group of digital devices that range from simple digital sensors, such as transponders, to more sophisticated computing devices, such as laptop computers. Each of the devices in the IoT have the underlying capability to collect and transmit data via a network, like the Internet. Particularly, in the example of FIG. 1, nodes 111a-111h in the network 110 may be devices having the processing capability (and resources) to participate in e-transactions, such as laptop computers, smartphones, tablets, desktop computers, and the like.

As alluded to above, "things" in the Internet of Things may refer to a wide variety of devices such as heart monitoring implants, biochip transponders on farm animals, automobiles with built-in sensors, smart lights, and smart thermostat systems that may allow remote monitoring. It is expected that the Internet of Things may grow to include billions of devices in the near future. Due to the high volume, distributed arrangement, and scalability (set of sensors or digital devices) that are characteristic of IoT systems, the technology provides organizations with new and innovative ways to perform, manage, and monitor a plurality of operations.

According to an embodiment, the network of nodes 110 involves multiple nodes 111a-111h that are communicatively connected to each other and other elements of the DLSeT platform 100. Furthermore, the nodes 111a-111h are capable of performing e-transactions via the DLSeT platform 100 in a peer-to-peer (P2P) manner. As an example, a node 111a can be a smartphone associated with a first user whom is requesting payment from a second user. Node 111h can be a laptop that is being used by the second user to transmit an electronic payment to be received by the first user in an eCommerce environment. Furthermore, as IoT devices, the nodes 111a-111h are enabled for remote data collection, that can consistently feed information into applications and data stores of the DLSeT platform 100. Due to the distributed framework and high connectivity, a system of IoT devices can have a scalability (e.g., adaptable number of devices in use) and ease of deployment that is leveraged for observing and managing activities that may be out of reach of a centralized facility (e.g., higher performance computing devices). With IoT systems, it is possible to gather vast amounts of data, which is generated by the connected devices, in order to provide insights that can deliver value to enterprise applications.

As previously mentioned, the network of nodes 110 allows connectivity amongst the nodes 111a-111h on the network, where the connections are established using wireless technology. There are many technologies that enable communication between devices in a IoT network, such as Bluetooth Low Energy (BLE), Near Field Communications (NFC), Radio Frequency Identification (RFID), ZigBee, Narrowband IOT (NB-IOT), WiFi (e.g., the various 802.11xx standards), etc. Thus, the network of nodes 1110 may be IoT devices communicating via a WLAN, such as a WiFi network. In order for a node 111a, for example, to connect to other elements of the DLSeT 100, for instance providing service in the cloud, the node 111a may communicate over, e.g., a WiFi network, and thus is configured to connect to the WiFi network through network discovery procedures.

In a WiFi-compliant WLAN, access points (APs) receive data by wired Ethernet, perform a conversion to 2.4 GHz or 5 GHz wireless signals, and send/receive wireless traffic to and from nearby wireless clients or devices, e.g., IoT devices and WiFi clients. However, an AP is not only a WiFi provider, but also an IoT service provider. Nowadays, many APs integrate two or more of the aforementioned communications technologies such that multiple types of communications technologies function together, e.g., WiFi and BLE, RFID and ZigBee. Although e-transaction in the IoT environment is described for purposes of discussion, it should be appreciated that the DLSeT platform 100 can support various types of interactions, including but not limited to: inter-blockchain; mobile-to-mobile (Mo2Mo); IoT-to-Mobile (I2M); Mobile-to-IoT (M2I); IoT-to-IoT (I2I); IoT-to-IoT to Cloud security infrastructure (which does not rely on any third-party, vendor or server. Furthermore, the DLSeT platform 100 can support encryption channels that allow secure communication between nodes within the system during an e-transaction. An example of a handshake to establish an encryption channel is discussed in greater detail below, in reference to FIG. 4.

As previously described, a key feature of the DLSeT platform 100 is the integrated support of Mobile, IoT and blockchain on a shared platform. The DLSeT platform 100 allows for communication in a manner that provides various blockchain features, such as smart contracts, decentralization, and immutability, to be leveraged for supporting e-transactions amongst the IoT devices. Thus, the DLSeT platform 100 implements a number blockchain-enabled features, such as a distributed ledger 125 for e-transactions, asynchronous Byzantine Fault Tolerance, and local consensus. Accordingly, the network of nodes 110 can also be considered as a blockchain network. The network of nodes 110 can be a blockchain network where nodes 111a-111h can communicate in a peer-to-peer (P2P) manner, use a consensus mechanism to update the distributed ledger 125, or the blockchain, that is distributed across the multiple parties.

As part of the blockchain aspects, the platform 100 can include a distributed data store, illustrated in FIG. 1 as data source 190. Each of the nodes 111a-111h on the blockchain have access to data of the data source 190 and its history. In some embodiments, no single party controls the data or information that is maintained by data source 190. Furthermore, each of the node 111a-111h that acts as a participant of a transaction, can verify the records of its transactions partners without an intermediary.

As alluded to above, P2P transmission between nodes is a characteristic of IoT and blockchain, which is also leveraged by the DLSeT platform 100. AS such, communication between nodes 111a-111h may occur directly between peers (as opposed to through a central node). Each of the nodes 111a-11h has the capability to store and forward information to another node in the network 110. The particular number, configuration and connections between nodes 111a-111h may vary. As such, the arrangement of nodes 111a-111h shown in FIG. 1 is for illustrative purposes only.

As shown in FIG. 1, the distributed ledger 125 is a component of the DLSeT platform 100. As a general description, the distributed ledger 125 may include a series of blocks of data relating to an e-transaction executed between any of the nodes 111a-111h on the DLSeT platform 100. A characteristic of the distributed ledger, is that a block can reference at least another block in the distributed ledger 125, such as a previous block. In this manner, the blocks of data representing each e-transaction may be chained together. The distributed ledger 125 may store blocks that indicate a state of transaction, for example the particular nodes patriating in the transaction, the type of transaction (e.g., payment), and the like. Thus, the distributed ledger 125 may store an immutable record of the transactions (including states of the transactions). Furthermore, the distributed ledger 125 can be configured to support transparency with pseudonymity. In other words, each of the nodes 111a-111h, by having permissions to access the platform 100, has the potential to download every transaction (and its associated value) on the distributed ledger 125. Nodes 111a-111h also keep record of its respective transactions, and is restricted to accessing only those transactions that it was a party to. Furthermore, each of the nodes 111a-111h are identified on the platform 100 via an universal wallet address (UWA) string, as opposed to personal identifiable information like a social security number, or account number that may pose privacy concerns, and security risks. Thus, users of the DLSeT platform 100 can remain anonymous while participating in e-transactions on the platform 100.

Furthermore, the platform 100 can utilize smart contracts 150. The smart contracts 150 may include rules that configure the functionality of nodes 111a-11h in the blockchain network. Accordingly, digital assets used on the platform 100 can be controlled by automation or lines of codes of the smart contact 150, acting as an initial agreement for performing certain functions. Thus, the smart contacts 150 can be programmed such that nodes 111a-111h behave in certain ways in relation to e-transactions on platform 100. For example, the rules of a smart contact 150 may specify actions for verifying the identities of participants involves in a transaction. Thus, the smart contacts 150 can be used to implement various approaches and protocols used by the DLSeT platform 100. For example, smart contracts 150 can implement aspects of SKI, Zero Knowledge Triangle Flow (ZT-Flow) or Zero Knowledge Proof (ZKP), Prove of Simple UWA Assignment (Po(SuA)), and other actions that a node may take for completing a transaction in accordance with blockchain. Details of the aforementioned protocols are described further below, for example in reference to FIG. 2 and FIG. 3.

Referring back to FIG. 1, the DLSeT platform 100 is shown to include a contract logic 170 component. Due to the digital nature of the distributed ledger 125, blockchain transactions can be tied to programmable logic that may be a pre-installed software, circuitry, or firmware aspects of the platform 100. The contract logic 170 may be employed by a user to set up algorithms and rules that define smart contracts 150 and other agreements that trigger transactions between nodes 111a-111h. Also illustrated in FIG. 1, is the local confirmation of transactions, which is a feature of the DLSeT platform 100. In many existing blockchain platforms, transactions are confirmed in a centralized manner. In contrast, the disclosed embodiments support a decentralized confirmation, shown as a local confirmation 180 component of platform 100.

In FIG. 1, a data life cycle framework 120 is shown as a component of the DLSeT platform. As feature of the platform 100, much of the data utilized by the platform 100 can be stored and managed locally (e.g., at each of the nodes 111a-111h), rather than at a centralized data center. As a consequence of localized data, users will have improved control of their data. Many current blockchain platforms distribute data to various point in a worldwide network, allowing other entities to obtain, and potentially control, data for the end users. The DLSeT platform 100 is configured such that only the participants of a particular transaction share data, or have the capability to access data. Consequently, no other party is allowed to access to the user's data, imparting ultimate control of data's life cycle to the end-users. Restated, users decide the fate of their data, instead of big data brokers. Users of the platform 100 can leverage benefits associated with the DLCF 120 features, such as being able to sell their data for asset gains.

Also, the records of the distributed ledger 125 are immutable, meaning that once a transaction is entered into the blockchain, that the record cannot be altered or reversed. Accordingly, the distributed ledger 125 can store a current and historic records of e-transaction, as it pertains to the DLSeT platform, that is permanent, secure, indelible, and unalterable. For instance, the distributed ledger 125 may store a historical chain of successful e-transactions, which cannot be manipulated. In some embodiments, the distributed ledger 125 hold additional records, models, and smart contracts. In addition, the distributed ledger 125 can employ the cryptographic infrastructure that is supported by ECSMID 140 components of the DLSeT platform 100.

Additionally, the DLSeT platform 100 can realize scalability, by having various aspects of its functionality that can be implemented by any combination of the various components in the architecture shown in FIG. 1. For example, as previously described, the platform 100 can include some software aspects that are installed at the nodes 111a-111h. On a high level, the platform 100 implements: user profile managing functions (e.g., user profile manager), pertaining to the verifiable attributes which links the user to a specific profile and wallet; instrument managing functions (e.g., instrument manager), pertaining to a type of cryptocurrency used, for example LCN; protocol managing functions (e.g., protocol manager), pertaining to the protocols used to negotiate the transactions, such as LCN encryption/decryption for payments; user interface functions (e.g., user interface), pertaining to supporting a graphical user interface (GUI) which makes the process easy, transparent and visible to users; Wallet controlling functions (e.g., wallet controller), pertaining to controlling the wallets, UWAs, and the interrogation of node in a transaction; and communication/transaction managing functions (e.g., transaction manager), pertaining to connection abstraction to support remote connections which for sessions, such as sessions between a wallet and another node (message, response). In some cases, transactions are asynchronous, where the communication/transaction manager creates a request (over HTTP), and response (using TCP/IP) over ethernet network. This allows for accountability, and manages all transactions (including unsuccessful transactions). These abovementioned functions can be processes implemented by the platform 100, which enables secure, efficient, transactions between IoT devices, as disclosed herein.

Figure 2:
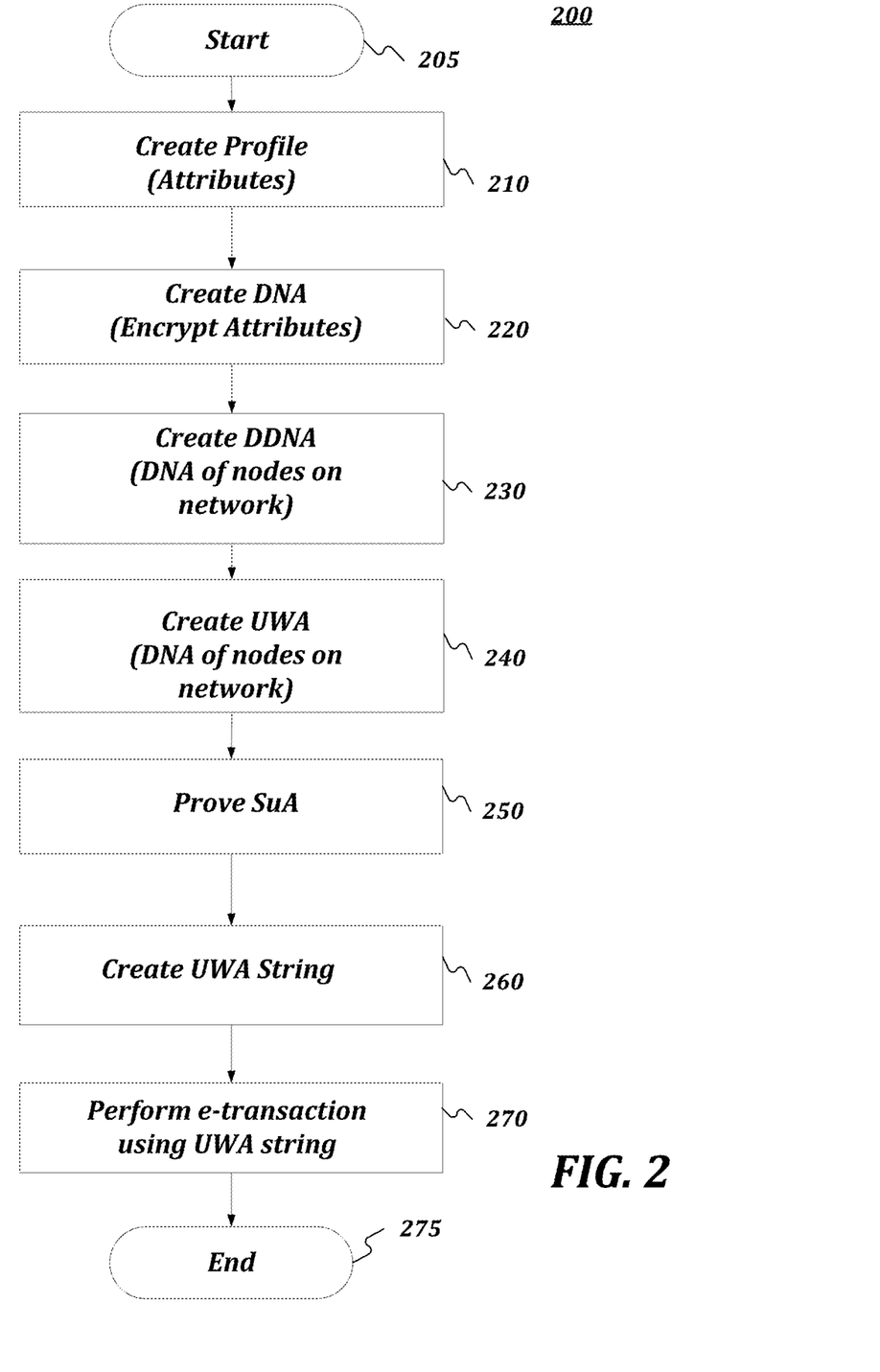
FIG. 2 depicts an example of a method of implementing secret key infrastructure (LFSKI) on the DLSeT platform, in accordance with an exemplary embodiment of the present disclosure

Referring now to FIG. 2, illustrates an example of a process 200 that can be implemented on the DLSeT platform (shown in FIG. 1). By performing the process 200, the DLSeT platform provides secure, blockchain-enabled, e-transactions to mobile devices (in a IoT environment), as disclosed herein. The process can begin at operation 205. In some cases, start 205 can involve registering a user (where a user can be associated with one or more devices) to the DLSeT platform. Next, the process 200 proceeds to operation 210, where a profile for the user is created.

The profile can be created and managed by a profile manager, which is an element of the DLSeT platform. According to the embodiments, a profile created in operation 210 can include multiple attributes of the user. The attributes comprising the profile are various forms of data that serve to identify a particular user. In an embodiment, a profile includes 14 attributes: 1) full name/company name; 2) registered: company email/email; 3) location: address/company address; 4) electronic fingerprint (eFRI); 5) password; 6) MPIN; 7) driver's license number (DL #); 8) passport number (PP #); 9) IMEI/MAC/UID; 10) cell phone/mobile number in use; 11) other biometrics; 12) date of birth; 13) social security number (SS #); 14) Username; 15) FEIN. Each profile can be used by any one node on the platform, which allows access in a decentralized approach. At the core of the created profile is the concept of including information that signifies: 1) what you are (WYA)—referring to anatomical features on a user's being that can be used as an infallible mean of identification that are referenced to the thumbs and other body parts as unique, printable, non-duplicable, portable and legally collectible as a reference to physiological facts directly connected to other user's anatomy e.g., finger print, iris, and face; 2) what you have (WYH)—referring to whatever was given to a user that was obtained from an authorized person as an enabler to gaining access to any system that authenticates the user in, for further authorization of resource usage, e.g., soft and hard token; and 3) what you know (WYK)— referring to user selectable information, in the form of a PIN and password of a certain acceptable complexity such as alphanumeric and special-character ensemble which is only possessed by the corresponding user. This aforementioned user data (classifiable as WYA, WYH, and WYK information) can be used to create a data structure, such as a table or mathematical set, that can emulate the file permission (e.g., Unix/Linux OS). Therefore, a profile created in operation 210 can be leveraged to identify a user, and further in implementing access permissions for the nodes involved in e-transactions via the platform.

Subsequently, the process 200 can proceed to operation 220 where a DNA corresponding to a particular user is created from the profile. Also, operation 220 involves encrypting the profile in order to form the DNA. For example, a software component of the DLSeT platform, implemented locally at a node, implements the encryption. Each attribute can be converted into M1-M5 ciphertext modes. In some embodiments, the output of the cipher can become the input of the next (up to five times).

Next, at operation 230, a plurality of DNAs can be communicated and maintained via the DLSeT platform, thereby creating a DDNA. As an example, each generated DNA that corresponds to a user on the platform can be communicated to, and then be stored by, a profile manager on the platform. The collection of DNAs, for instance from each device on an IoT network, can be considered the DDNA for that network. In some cases, the DDNA can be scalable as deemed appropriate. Thus, a DDNA created during operation 230 can include the DNAs from a portion, all, or any combination thereof for devices associated with DLSeT platform. The DDNA can serve similar to a digital phonebook that includes identities of the platform's users. Furthermore, the DDNA can be commonly stored at each of the nodes in the platform, being consistent with the distributed characteristics of blockchain and IoT. Storing the DDNA can also be centralized, where the DDNA is maintained at a storage device of the platform (accessible to each of the nodes).

Thereafter, the process 200 can continue to operation 240. During operation 240, a UWA for a user can be created. The UWA can be an address that is particularly utilized by the DLSeT platform, which associates a user to each of their devices that may be used for e-transactions. For instance, a user can own a laptop device, a desktop computer (at home), a smartphone, and a wearable device (e.g., compatible with the smartphone). Each of the user's devices may have a software aspect of the DLSeT platform installed thereon, such as the Lockchain Wallet App, enabling each of the respective devices to patriciate in e-transactions via the platform. Particularly, as alluded to above, a LCN wallet can hold LCN tokens (e.g., maintaining LCN balances), enabling LCN to be a cryptocurrency that is supported in transactions on the platform. The LCN Wallet App can support a user's UWA created during operation 240, in a manner that ties all of aforementioned devices with the single user. Accordingly, a common UWA is usable across the plurality of devices, allowing the user conduct an e-transaction from their laptop, smartphone, or smartwatch, using their single corresponding UWA. Restated, the UWA effectively ties a user to their attributes (within the associated DNA), as opposed to a hardware address of the device itself. In which UWA will then be a peg of visibility on any device the user logs into.

Deriving the UWA can include using eFRI (fingerprint, IMEI or MAC) and full name or company name at operation 240. As an example, a UWA can be generated from a total number of $2^{2048}$ possible UWA addresses. This is true when the values making up the UWA are chosen from 256 characters noting that it could be a unique character-value in each element. In an embodiment, generating the UWA in operation 240 involves an UWA generation algorithm, an example for the UWA is shown below:

Encrypt(fingerprint_number+MAC_number'(PKT$_n$FP-DEC-String=M$_{nanychosen}$;PKT$_n$MACHex-Dec=M$_{nanychosenreserse}$;PKT$_n$MACSL-DEC-Str=M$_{nanychosen}$)

send-Wallet manager
Decrypt=eFRI components
Build Biometrics(eFRI)
arrange them in order—compare-all to the data profile variables. If these compared fields match, then the wallet is verified and validated.
compare-all to the data profile variables
If these compared fields match, then the wallet is verified and validated As an example, if a full name, for instance "Mike Obrien" is added to the abovementioned algorithm using SL-M$_1$ as the cipher you will get the Wallet address or ID: 197,213,229,182,198,214,230^KT$_{n=136}$. An M2 swap can be performed to make all same name, for example multiple "Mike Obrien" unique. This can be done by carrying out the password process on it using a periodic and random password (k) of length D=fullname.length. A password can be streamed across the 'Fullname' to generate a UWA for public use. Moreover, the prove of simple universal wallet address assignment (PO(SuA)) protocol, can be implemented by sending to the recipient all or part of the number(s) used in generating the UWA to prompt the user to build the wallet address, and then compare it to the user's profile attributes.

Accordingly, the process can proceed to operation 250, where the PO(SuA) is implements. In some cases, proving the simple UWA can be initiated after the UWA is formed. Each node is required to solve and confirm the UWA for another user, prior to participating in an e-transaction with that particular user corresponding the UWA. Once that UWA is confirmed, that profile managers can be updated to reflect the verification. The PO(SuA) protocol ensures that an e-transaction supported by the DLSeT platform is only executed between vetted, and authorized users in the network. Consequently, the PO(SuA) provides security even within an IoT environment, helping to mitigate threats such as DDOS and other cyber threats.

Next, at operation 260, a UWA string can be created that serves as a unique alphanumeric special character that identifies a particular user. For instance, operation 260 can form a UWA string having a maximum of 32 characters that corresponds to a user of a node in the DLSeT platform. In an example, the UWA string can specifically include a user's fingerprint (e.g., WYA information), IMEI or MAC (e.g., WYH information), and name (e.g., WYA information). In some cases, a user cannot remain pervasive on the DLSeT platform within a password and MPIN (e.g., WYK information).

Then, continuing to operation 270, one or more e-transactions can be executed via the DLSeT platform using the UWA strings from previous operation 260. During operation 270, nodes can conduct various e-transactions on the DLSeT platform, such as payments, with their corresponding UWA strings. This can be considered a UWA digital threshold, where a transactions is supported on the DLSeT platform only with a UWA string for each participating node. Conversely, a node that is not authorized or properly identified by possessing the aforementioned UWA string, will not have permission to perform e-transactions on the platform. The DLSeT platform is configured to maintain secure transactions, even if an unidentified node somehow establishes a connection with an IoT network. An example of an e-transaction that can occur on the DLSeT platform during operation 270 is described in greater detail below in reference to FIG. 3. Generally, the blockchain aspect of the platform ensures that an immutable record of each successfully executed e-transaction between nodes on the DLSeT platform, for example in operation 270, is maintained in its distributed ledger. Therefore, the DLSeT platform integrates blockchain and IoT such that integrity and trust, involving some degree of confidence for transactions in a trust-less IoT and mobile environment, is realized.

Figure 3:
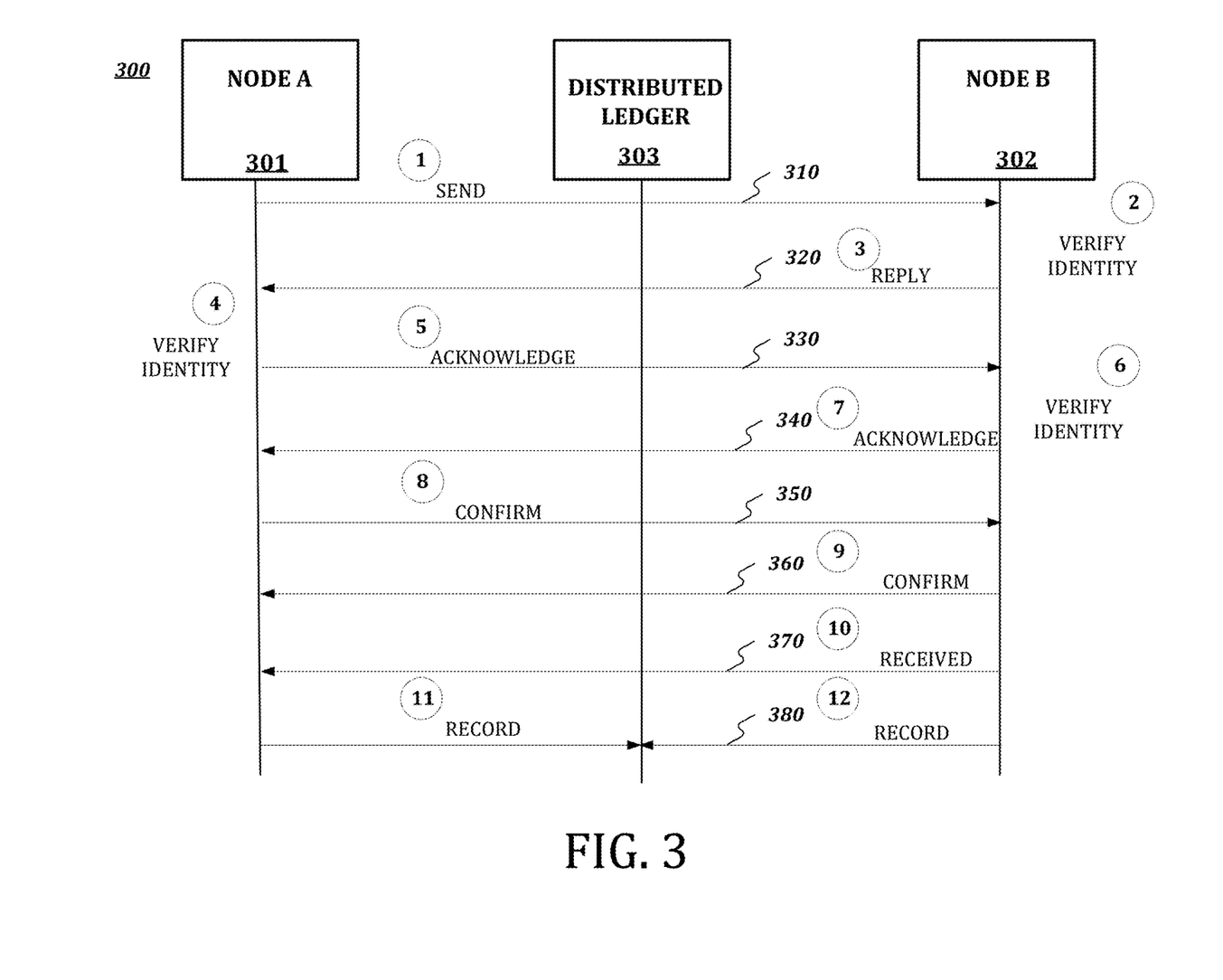
FIG. 3 depicts an example of a message flow related to an e-transaction executed on the DLSeT platform of FIG. 1, in accordance with an exemplary embodiment of the present disclosure.

In FIG. 3, an example of a message flow 200 between nodes in an e-transaction, in accordance with the DLSeT platform, is depicted. The communication in FIG. 3 can be associated with an e-transaction between a Node A 301 and a Node B 302 that was successfully conducted and confirmed, ultimately being recorded in the distributed ledger 303 of the DLSeT platform. The flow 300 can begin at exchange 310 where a send message is communicated from Node A 301 to be received by Node B 302. The SEND message can be a SMS or email that is transmitted by Node A 301, and encrypted to Node B 302. For example, a user of Node A 301, which can be a smartphone, can initiate an e-transaction by sending an electronic payment from to another user on the platform, namely the user of Node B 302, which can be a laptop. The SEND message can include text describing the transaction, for example "Hey, I am sending you $10 and invoice." The SEND message of exchange 310 can be encrypted, for instance as ((msg+rnd sessionid #+stripped M3 MPIN of B). Node B 302 can be already registered on the DLSeT platform, and having a unique profile (internal or external) (e.g., in the profile manager).

Upon Node B 302 successfully receiving the SEND message in exchange 310, Node B 302 verifies the identity of the sender, namely Node A 301. Node B 302 can receive the SEND message, and then decrypts the entire message. In some cases, the M3 MPIN must first be decrypted. Then, a decrypted payload can be compared to the stripped M2 encrypt on the Node B 302. Thus, Node B 302 verifies its ID as an intended participant in the e-transaction. As a result, Node B 302 can present the decrypted content of the SEND message to an associated user, for example as plaintext on its laptop screen.

Subsequently, Node B 302 can transmit a REPLY message to Node A 301 in exchange 320. As an example, the user of Node B 302 may read the decrypted text on their laptop, and constructs an email including text as content for the REPLY message. For instance, the text of the REPLY message can read "Hey, I got your $10 and invoice and I agree to the terms. Can you acknowledge?" Similarly, text of the REPLY message can be encrypted for secure transmission to Node A 301 in exchange 320. The REPLY message can be encrypted as [msg+(rnd session ID #+1)+A M3 MPIN stripped].

Then, in response to Node A 301 successfully receiving the REPLY message in exchange 320, the message can be decrypted allowing Node A 301 to verify that it is the intended participant in the e-transaction (e.g., associated with the received REPLY message). Node A 301 can first decrypt the stripped M3 MPIN encrypt. Node A 301 decrypts this to M2 MPIN encrypt, and compares this M2 MPIN to the its stored M2 MPIN encrypt. If it is a match, verifying the user's identify corresponding to Node A 301, the user will be directed to the right code point in order to read the entire REPLY message, including text, sent by Node B 302 in exchange 320. After reading text of the REPLY message, for example, the user of Node A 301 can now validate the transaction by transmitting an ACKNOWLEDGE message back to Node B 302 in exchange 330. Similarly, the ACKNOWLEDGE message in exchange 330 can be encrypted. The ACKNOWLEDGE message can also include text content, such as an SMS message that reads "Ok, I agree; this is a valid transaction close the deal." An example encryption for the REPLY message of exchange 330 is [msg+((rnd session ID+1)+1)+B M3 MPIN stripped].

In response to successfully receiving the ACKNOWLEDGE message in exchange 330, Node B 302 can send back another ACKNOWLEDGE message to be received by Node A 301 in exchange 340. The ACKNOWLEDGE message is received by Node B 302 in exchange 330 being encrypted. Thus, Node B 303 can decrypt the ACKNOWLEDGE message in exchange 330 after receipt. Decrypting can involve Node B 302 initially decrypting the stripped M3 MPIN sent by Node A 301 to M2 MPIN, which is then compared to the one held on Node B 302. If it is a match, then Node B 301 will have again verified the identify its user. Successfully verifying the user allows Node B 302 to access the code point to read the entire message of ACKNOWLEDGE message received from Node A 301 in exchange 330.

The ACKNOWLEDGE message that is sent by Node B 302 in exchange 340 can also include text, for instance an email stating, "Ok, I agree. This is a valid transaction by me too." Thereafter, Node A 301 receives the ACKNOWLEDGE message sent from Node B 302 in exchange 340. In response to receiving the ACKNOWLEDGE message of exchange 340, in some cases, the user of Node A 301 can have a final chance to make any final changes to the transactions. Then, if approved by the user, Node A 301 can confirm this transaction by transmitting a CONFIRM message in exchange 350.

Node B 302 receives the CONFIRM message from Node A 301 in exchange 350. Thus, Node B 302, can transmit its CONFIRM message to Node A 301 in exchange 360, indicating that the other participating user also confirms the transaction. For example, the user of Node B 302 can read text of the final SMS communicated from Node A 301, and agrees to the indicated amount of payment amount and terms of the e-transition. Then, Node B 302 can received the token, for instance Lokcoin, as payment in the e-transaction in the form of crypto-currency. In an example, the user can interact with the Lokcoin Wallet App, which is a component of the DLSeT platform that is installed on Node A 301. The Lokcoin Wallet App can allow the user to transfer a Lokcoin token or any other approved data from its wallet, where the confirmation causes a transaction manager to be alerted. The transaction manager, being triggered by the confirmations, can debit Lokcoin from the wallet associated with Node A 301, and credits Lokcoin to the wallet associated with Node B 302 completing the e-transaction.

Thereafter, both Node A 301 and Node B 302 record the transaction in the distributed ledger 303 of the DLSeT platform in exchange 380. The record associated with this e-transaction can include pertinent information, such as a header and metadata related to the details of the transaction (e.g., description, sender, recipient, amount, etc.) and time stamp. In some cases, a final message, such as a SMS or email can be communicated to the participants, namely Node A 301 and Node B 302 indicating that the e-transaction went through, and a record of the successful transaction has been added to the blockchain.

As shown in FIG. 3, the flow 300 for an e-transaction includes a three-way handshake which verifies the identity of both users of the participating nodes, namely Node A 301 and Node B 302. This three-way handshake depicts an example of the Zero-Knowledge Triangle Flow (ZT-flow), a protocol implemented by the disclosed DLSeT platform. The ZT-Flow protocol ensures that participants of the transaction acknowledge a first message, as well as confirm receipt of the message. This combination of acknowledging-confirming a message must be performed at least once, in each instance. If both the acknowledgement and confirmation is not received, for example by the sender, then the recording must be entered according, indicating this failure in the distributed ledger 303. For instance, it can be assumed that there is an network issue (e.g., failed connectivity). A transaction that is not completed can be recorded in the distributed ledger 303 as pending, such as the transaction in the above scenario. The distributed ledger 303 has an immutable record that the transaction is still pending, and can attempt to complete the transaction after an issue is resolved, for instance a reboot of the network. This supports an aspect of persistence or fault tolerance on the DLSeT platform, which prevents transactions from being lost, even in the event of an failure (e.g., network failure, or loss of connectivity to a node).

The e-transaction depicted in FIG. 3 can be identified. As seen in FIG. 3, flow 300 includes sending a message from Node A 301 to node B 302. For purposes of this discussion, the message includes a time that it is to send a sum of money denoted by $x.00. when x could be any positive number. Then an example of an identifier for the e-transaction, where Node A 301 sends a message to Node B 302 is below:

SndA-(zkp)B→RpyB-(zkp)A→AckA-(zkp)B→AckB
₹ CFMA→CFMB→RCVB→RCODBA

Moreover, in the three-wat ZT-flow protocol, the identifier can being with an arbitrary number (nonce) for the session identifier (sessionid). When A sends (SND) its request to B, it will be accompanied by a (session ID: xyz digits=101 time stamped-A). When B receives these, it will carry on a zero-knowledge prove (zkp), in order to read this message from A: Thereafter, B replies (RPY) to this message with (sessionid xyz+1 time stamped-A). After replying to the message. A will also carry out a zero-knowledge proof in other to acknowledge the response from B. The response might require a change or otherwise. After this A will acknowledge (ACK) by agreeing or modifying the message: All accompanied by (sessionid xyz+1+1 time stamped-A). B also upon receiving the acknowledgement from A will have to go through ZKP for the last time in this transaction. Only after this will B acknowledge (ACK) the modification from A or agreement from A: It will also be accompanied by (sessionid xyz+1+1+1 time stamped-B). In the end A will have to confirm (CFM) this response by B with (sessionid xyz+1+1+1+1 time stamped-A). By this A is saying this is final by me. B will also confirm(CFM) the confirmation by A with (sessionid xyz+1+1+1+1+1 time stamped-A). Once B enters its confirmation we then call this a confirmed or received transaction. Once the transaction is confirmed by the receiver, a transaction id is issued using the last sessionid (Obviously the one from A the sender) of the confirmed line of the transaction concatenated with the time stamped (military time format) 174013→5:40:13 PM. Transaction ID with then be S1107:174013.

It should be appreciated that, once the user associated with Node A 301 clicks on its last confirmation, its wallet be debited. Once user of Node B 302 clicks on its last confirmation leg, its wallet will be credited or receives the money, and the transaction is confirmed. The bookkeeping or accounting is done in the ledger soon after and recorded accordingly on the transaction profile with timestamp. Accordingly, an example of an identifier for the process, where other are a part of the reply except for RCV and RCOD, is below:

SND→RPY (2ZKP, 2ACK, 2CFM)→RCV→RCOD.

Regarding the SEND message, Node A 301 requests M3 encrypt of Node B from the profile manager (this could external or local) is put in place. Node A 301 will append this to the message to send to Node B 302. When Node B 302 receives the message, it will first decrypt the M3 to M2 embedded on its device storage space. Once a match is found it will move to the code point of the actual message. This is how Node B 302 performs ZKP before the message is read. Node B 302 can performs this before replying to Node A 301.

Node A 301 will perform its ZKP before acknowledging the REPLY message from Node B 302. As previously discussed, the message from Node B 302 came with M3 encrypt of Node A 301, which Node B 302 requested from the profile manager (this could be external or local). Node B 302 will append this to the message to send to Node A 301. When Node A 301 receives the message, it will first decrypt the M3 to M2 embedded on its device storage space. Once a match is found in the two, it will move to the code point of the actual message. This is how Node A 301 performs ZKP before the message is read. Node A 301 performs this before the acknowledgement, ACKNOWLEDGE message from Node A 301 is sent, to acknowledge the reply from Node B 302.

Node B 302 will have to perform another ZKP before acknowledging the ACKNOWLEDGE message from Node A 301. The message from Node A 301 came with M3 encrypt of Node B 302. Node A 301 will append this to the message to send to Node B 302. When Node B 302 receives the message, it will first decrypt the M3 to M2 embedded on its device storage space. Once a match is found it will move to the code point of the actual message. This is how Node B 302 performs the second ZKP before the message is read. Node B 302 performs this before replying back to Node A 301. The other part of the REPLY message will not require any ZKP thereafter. Node A 301 will now confirm the final transaction and Node B 302 will equally act in conformity and confirm as well.

Figure 4:
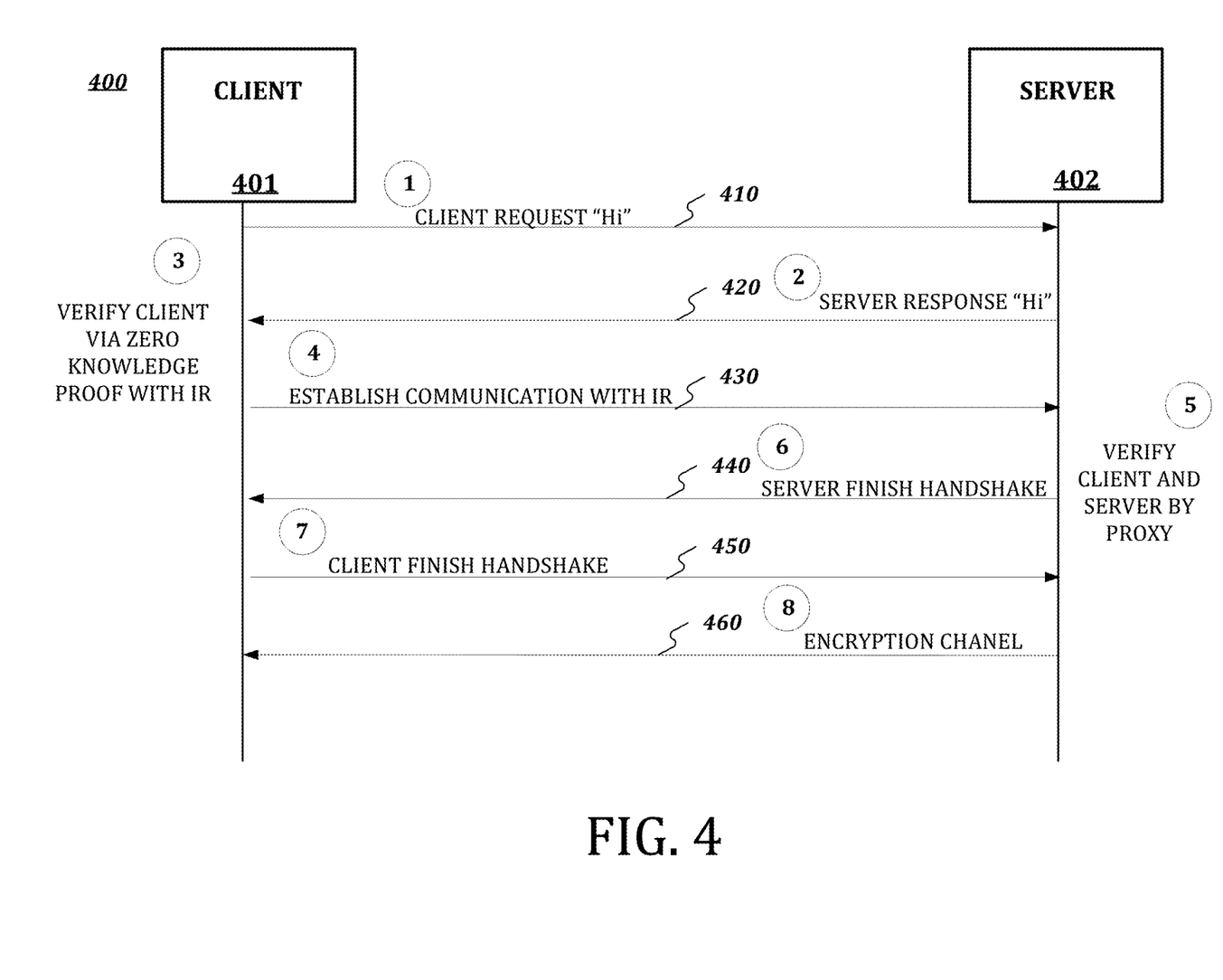
FIG. 4 depicts an example of a message flow related to establishing an encryption channel that can be used within the DLSeT platform of FIG. 1, in accordance with an exemplary embodiment of the present disclosure.

FIG. 4 shows an example of a message flow to establish a secure connection in the DLSeT platform in accordance with Lokdon encryption. In the illustrated example, the handshake occurs between a client 401 and a server 402 establishing an encryption channel for secure client/server communication during a session. The flow 400 can begin with exchange 410, where the client 401 sends a client request message to the server, which is shown as a "Hi" message. During the exchange 410, client 401 can send a cryptographic list on the order of possession, a Lokdon cryptosystem version; and information of capacity and protocols.

Thereafter, the server 402 receives the client request that is transmitted from the client 410 in exchange 410. In response to successfully receiving the client request message, the server 402 can send a server response message in exchange 420. As illustrated, the server response message is transmitted from the server 402 back to the client 401, signifying to the client 401 that its request was received by its intended destination. In the server's response during exchange 420, the server 402 can also present a cipher suite according to the cryptographic list that was provided by the client 401 in exchange 410. Additionally, the server response message communicated in exchange 420 can include a session id, the S M3PIN stripped and the C M3PIN stripped (e.g., stripped from the client request message).

Then, in exchange 420, the client 401 receives the server response message sent from server 401. The client 401 can be verified via the zero knowledge proof with intermediate representation (IR). This can be accomplished by matching the M3PIN sent from the server 402. The M3PIN sent by the server 402 is decrypted to yield a M2PIN. The resulting M2PIN can be compared to a local M2PIN, where a match indicates a successful verification.

In response to verifying the client 401, the client 401 can then send a message to the server 402 in to establish communication with IR in exchange 430. During exchange 430, the client 401 sends back to the server 402 an encrypted version of the original message. For example, the message communication from the client 401 in exchange 430 can include: S M3PIN stripped+session ID. Also, the encrypted message is equivalent to the s M3PIN stripped (Msg encrypted=S M3PIN stripped).

Subsequently, the server 402 receives the message to establish IR from the client 401 in exchange 430. After receiving that message, the server 402 can verify the client and server. In some cases, this verification can be done by proxy. In an example, after reception of the message in exchange 430, the M3PIN can be decrypted to yield the M2PIN. Subsequently, the resulting M2PIN can be compared to a local M2PIN at the server 402, where the hashes are taken and compared. In some cases, cryptographic hashing can be implemented using conventional secure hash algorithms, such as a SHA-256 hash. Also, other comparisons may be performed using other data included in the message, for instance in the event supplemental verification is required. For instance, a hash of the M2PIN is generated, and both SHA-256 hash values are compared where a match indicates successful verification (e.g., client authorization). Furthermore, the M3PIN can be encrypted, which generates a M4PIN.

Next, in response to a successful verification, the server 402 can transmit a message back in order to finish the handshake with client device 401, in exchange 440. After receiving the message from the server 402 in exchange 440, the client 401 can send a message to the 402, which confirms finishing the handshake in exchange 450. Thereafter, the handshake is complete, and the encryption channel can be established between the client 401 and server 402 in exchange 460. This secure communication supported via the encryption channel can continue until the session terminates. A session identifier (SID) can be assigned to messages in the flow 400 that constitute a session between client 401 and server 402. For example, a message can include: SID, (b) c. Furthermore, all of the messages in the flow 400 are read only, which provides an additional layer of security during the handshake.

Figure 5:
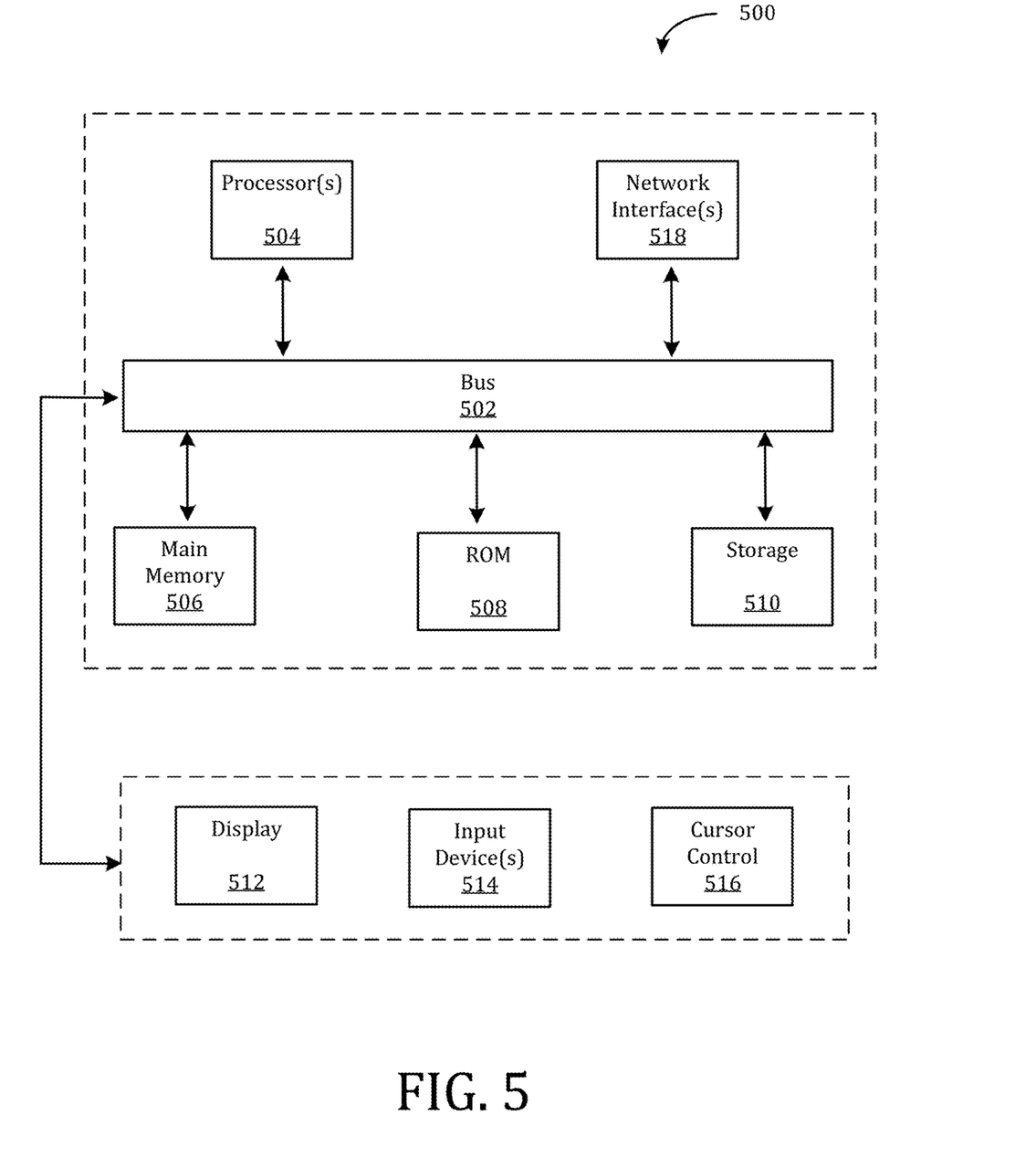
FIG. 5 depicts an example of a computer system that may be used in implementing the DLSeT platform of FIG. 1, in accordance with the exemplary embodiment of the present disclosure.

FIG. 5 depicts a block diagram of an example computer system 500 in which the disclosed aspects of the DLSeT platform (shown in FIG. 1) may be implemented. Furthermore, it should be appreciated that although the various instructions are illustrated as being co-located within a single processing unit, there may be some implementations in which processor(s) includes multiple processing units, allowing one or more instructions may be executed remotely from the other instructions.

The computer system 500 includes a bus 502 or other communication mechanism for communicating information, one or more hardware processors 504 coupled with bus 512 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 400 into a special-purpose machine that is customized to perform the operations specified in the instructions.

The computer system 500 further includes a read only memory (ROM) 408 or other static storage device coupled to bus 502 for storing static information and instructions for processor 504. A storage device 510, such as a magnetic disk, optical disk, or USB thumb drive (Flash drive), etc., is provided and coupled to bus 402 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 710, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
   a plurality of nodes with memory, wherein each of the plurality of nodes are communicatively connected via a distributed network;
   a distributed ledger, wherein the distributed ledger stores a plurality of records corresponding to a plurality of electronic transactions executed between at least two nodes amongst the plurality of nodes;
   a platform communicatively connected to the plurality of nodes and the distributed ledger, wherein the platform supports data transmission between the plurality of nodes during execution of plurality of electronic transactions and supports transmission of the plurality of records to the distributed ledger;
   wherein the platform supports a plurality of universal wallet addresses (UWAs) that respectively correspond to each of the plurality of nodes connected via the distributed network;
   wherein the universal wallet address is unique alphanumeric special character value generated from a digital nucleus aggregator (DNA) based on encrypted profile attributes corresponding to a first user associated with a first node of the plurality of nodes by further encrypting the DNA information comprising one or more encryption factors including a first encryption factor and a second encryption factor, wherein the first encryption factor is polymorphic encrypted ciphertext converted from the encrypted profile attributes associated with first user input, the polymorphic encrypting generated by:
      mapping indices from the encrypted profile attributes associated with the first user to a knight's tour encryption cipher template generated by mapping characters to a knight's tour template matrix,
      adding the mapped indices to a randomly generated silent password,
      performing modular arithmetic resulting in the first encryption factor converted polymorphic encrypted ciphertext,
   wherein the second encryption factor is polymorphic encrypted ciphertext converted from the first encryption factor, using the method of generating the first encryption factor encrypted ciphertext; and
   wherein the platform supports generating at least two unique identifiers based on the UWAs corresponding to the at least two nodes executing the electronic transaction and supports transmitting the least two unique identifiers with the data transmission during execution of the electronic transaction.

2. The system of claim 1, wherein the distributed network is an Internet of Things (IoT) network.

3. The system of claim 2, wherein the plurality of nodes are communicatively via a blockchain network.

4. The system of claim 3, wherein the distributed ledger is connected to the blockchain network.

5. The system of claim 1, wherein the plurality of nodes comprise wallets installed thereon which communicate data stored locally to each of the plurality of nodes to the platform for transmission during execution of the plurality of electronic transactions.

6. The system of claim 1, wherein the platform supports one or more smart contracts comprising rules for executing the plurality of electronic transactions and recording to the plurality of records to the distributed ledger distributed ledger.

7. The system of claim 6, wherein the platform supports a plurality of Digital Nucleus Aggregators (DNAs) that respectively correspond to a user of each of the plurality of nodes connected via the distributed network.

8. The system of claim 7, wherein the platform supports a Digital Data Nucleic Authority (DNNA) corresponding to the distributed network from the plurality of DNAs.

9. The system of claim 1, where the platform controls a life cycle of the data transmitted between the plurality of nodes during execution of plurality of electronic transactions.

10. A method, comprising:
   creating a profile associated with a first user, wherein the first user is associated with a first node connected to a network;
   creating a digital nucleus aggregator (DNA) corresponding to the first user, wherein the DNA comprises an encrypted profile associated with the first user;
   creating a universal wallet address (UWA) corresponding to the first user from the digital nucleus aggregator (DNA) corresponding to the first user wherein the universal wallet address is unique alphanumeric special character value generated using by encrypting the DNA information comprising one or more encryption factors including a first encryption factor and a second encryption factor, wherein the first encryption factor is polymorphic encrypted ciphertext converted from encrypted profile attributes associated with first user input, the polymorphic encrypting generated by:
      mapping indices from the encrypted profile attributes associated with the first user to a knight's tour encryption cipher template generated by mapping characters to a knight's tour template matrix,
      adding the mapped indices to a randomly generated silent password, performing modular arithmetic resulting in the first encryption factor converted polymorphic encrypted ciphertext, wherein the second encryption factor is polymorphic encrypted ciphertext converted from the first encryption factor, using the method of generating the first encryption factor encrypted ciphertext;

proving the UWA corresponding to the first user;

upon successfully proving the UWA, creating a UWA string based on the UWA; and transmitting a message from the first node to initiate an electronic transaction with a second node via the network, wherein the message includes the UWA string;

wherein the message transmitted from the first node to initiate the electronic transaction is transmitted to the second node;

in response to transmitting the message to initiate the electronic transaction, receiving a reply message from the second node; and verifying an identity associated with the reply message, wherein the reply message comprises an encrypted attribute appended thereto based on the UWA string.

11. The method of claim 10, wherein the profile for the first user comprises one or more attributes associated with the first user.

12. The method of claim 11, wherein the one or more attributes are selected from a group of data associated with the first user comprising: a personal identification number (PIN), password, a name, a username, an email address, a physical address, a date of birth, a cell number, employee identification number, a mobile telephone number, a social security number, an electronic fingerprint, a driver's license number, a passport number, and biometric data.

13. The method of claim 12, further comprising:
encrypting each of the one or more attributes;
creating the DNA corresponding to the first user based on the encrypted one or more attributes.

14. The method of claim 10, wherein verifying the identity associated with the replay message comprises:
decrypting the attribute appended to the reply message;
comparing the decrypted attribute appended to the reply message to the DNA corresponding to the first user; and
upon determining that the decrypted attribute appended to the reply message matches at least one attribute in the DNA corresponding to the first user, determining that the identity associated with the reply message is verified.

15. The method of claim 14, further comprising:
in response determining that the identity associated with the reply message is verified, transmitting an acknowledgement message to continue completing the electronic transaction with the second node via the network.

16. The method of claim 15, further comprising:
transmitting a confirmation message from the first node, wherein the confirmation message is associated with completing the electronic transaction with the second node via the network; and
in response to receiving an additional confirmation message from the second node, transmitting a record message to a distributed ledger via the network, wherein the record message records the electronic transaction within data stored by the distributed ledger.

17. The method of claim 10, further comprising: creating a plurality of Digital Nucleus Aggregators (DNAs) that respectively correspond to one or more users of each of a plurality of nodes connected via a distributed network from the digital nucleus aggregator (DNA) corresponding to the first user.

18. The method of claim 17, further comprising: storing, by a profile management module, the plurality of Digital Nucleus Aggregators (DNAs) that respectively correspond to one or more users of each of a plurality of nodes connected via the distributed network.

\* \* \* \* \*